(12) United States Patent
Bloch et al.

(10) Patent No.: US 11,900,968 B2
(45) Date of Patent: *Feb. 13, 2024

(54) SYSTEMS AND METHODS FOR DYNAMIC VIDEO BOOKMARKING

(71) Applicant: JBF Interlude 2009 LTD, Tel Aviv (IL)

(72) Inventors: Jonathan Bloch, Tel Aviv (IL); Barak Feldman, Tenafly, NJ (US); Tal Zubalsky, Brooklyn, NY (US); Yuval Hofshy, Kfar Saba (IL); Amiel Shapiro, Tel Aviv-Jaffa (IL)

(73) Assignee: JBF Interlude 2009 LTD, Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,168

(22) Filed: Mar. 22, 2022

(65) Prior Publication Data

US 2022/0215861 A1 Jul. 7, 2022

Related U.S. Application Data

(63) Continuation of application No. 17/138,434, filed on Dec. 30, 2020, now Pat. No. 11,348,618, which is a
(Continued)

(51) Int. Cl.
*G11B 27/34* (2006.01)
*G11B 27/031* (2006.01)

(52) U.S. Cl.
CPC .......... *G11B 27/34* (2013.01); *G11B 27/031* (2013.01)

(58) Field of Classification Search
None
See application file for complete search history.

(56) References Cited

U.S. PATENT DOCUMENTS 4,569,026 A 2/1986 Best
5,137,277 A 8/1992 Kitaue
(Continued)

FOREIGN PATENT DOCUMENTS

CA 2639491 A1 3/2010
DE 004038801 A1 6/1992
(Continued)

OTHER PUBLICATIONS

U.S. Appl. No. 14/884,285 Published as US2017/0178601, Systems and Method for Assembling a Recorded Composition, filed Oct. 15, 2015.
(Continued)

*Primary Examiner* — Toan H Vu
(74) *Attorney, Agent, or Firm* — Goodwin Procter LLP (57) ABSTRACT

Methods and systems for dynamic bookmarking in branched video are described. An application provides a video tree having a plurality of video segments, with each video segment including a predefined portion of one or more paths in the video tree, and each path being associated with a different video presentation. One of the paths in the video tree is traversed based on one or more decisions made by a user during playback of the video presentation associated with the path being traversed. A selection of a particular location in the path being traversed is received by the application, which stores a bookmark of the location for subsequent retrieval. The bookmark identifies a sequence of video segments in the video tree having been traversed to reach the location. The structure of the video tree is modified, and the bookmark is automatically updated, if necessary. At a later time, the application receives a selection of the stored bookmark and seeks to the bookmarked location. The application further restores the decisions made by the user during the previous playback of the presentation.

20 Claims, 5 Drawing Sheets

Related U.S. Application Data continuation of application No. 16/865,896, filed on May 4, 2020, now Pat. No. 10,885,944, which is a continuation of application No. 15/703,462, filed on Sep. 13, 2017, now Pat. No. 10,692,540, which is a continuation of application No. 14/509,700, filed on Oct. 8, 2014, now Pat. No. 9,792,957.

(56) References Cited

U.S. PATENT DOCUMENTS

| | | |
|---|---|---|
| 5,161,034 A | 11/1992 | Klappert |
| 5,568,602 A | 10/1996 | Callahan et al. |
| 5,568,603 A | 10/1996 | Chen et al. |
| 5,597,312 A | 1/1997 | Bloom et al. |
| 5,607,356 A | 3/1997 | Schwartz |
| 5,610,653 A | 3/1997 | Abecassis |
| 5,636,036 A | 6/1997 | Ashbey |
| 5,676,551 A | 10/1997 | Knight et al. |
| 5,694,163 A | 12/1997 | Harrison |
| 5,715,169 A | 2/1998 | Noguchi |
| 5,734,862 A | 3/1998 | Kulas |
| 5,737,527 A | 4/1998 | Shiels et al. |
| 5,745,738 A | 4/1998 | Ricard |
| 5,751,953 A | 5/1998 | Shiels et al. |
| 5,754,770 A | 5/1998 | Shiels et al. |
| 5,818,435 A | 10/1998 | Kozuka et al. |
| 5,848,934 A | 12/1998 | Shiels et al. |
| 5,887,110 A | 3/1999 | Sakamoto et al. |
| 5,894,320 A | 4/1999 | Vancelette |
| 5,956,037 A | 9/1999 | Osawa et al. |
| 5,966,121 A | 10/1999 | Hubbell et al. |
| 5,983,190 A | 11/1999 | Trower, II et al. |
| 6,067,400 A | 5/2000 | Saeki et al. |
| 6,091,886 A | 7/2000 | Abecassis |
| 6,122,668 A | 9/2000 | Teng et al. |
| 6,128,712 A | 10/2000 | Hunt et al. |
| 6,160,952 A | 12/2000 | Mimura et al. |
| 6,191,780 B1 | 2/2001 | Martin et al. |
| 6,222,925 B1 | 4/2001 | Shiels et al. |
| 6,240,555 B1 | 5/2001 | Shoff et al. |
| 6,298,020 B1 | 10/2001 | Kumagami |
| 6,298,482 B1 | 10/2001 | Seidman et al. |
| 6,460,036 B1 | 10/2002 | Herz |
| 6,535,639 B1 | 3/2003 | Uchihachi et al. |
| 6,657,906 B2 | 12/2003 | Martin |
| 6,698,020 B1 | 2/2004 | Zigmond et al. |
| 6,728,477 B1 | 4/2004 | Watkins |
| 6,771,875 B1 | 8/2004 | Kunieda et al. |
| 6,801,947 B1 | 10/2004 | Li |
| 6,947,966 B1 | 9/2005 | Oko, Jr. et al. |
| 7,085,844 B2 | 8/2006 | Thompson |
| 7,155,676 B2 | 12/2006 | Land et al. |
| 7,231,132 B1 | 6/2007 | Davenport |
| 7,296,231 B2 | 11/2007 | Loui et al. |
| 7,310,784 B1 | 12/2007 | Gottlieb et al. |
| 7,319,780 B2 | 1/2008 | Fedorovskaya et al. |
| 7,379,653 B2 | 5/2008 | Yap et al. |
| 7,430,360 B2 | 9/2008 | Abecassis |
| 7,444,069 B1 | 10/2008 | Bernsley |
| 7,472,910 B1 | 1/2009 | Okada et al. |
| 7,627,605 B1 | 12/2009 | Lamere et al. |
| 7,650,623 B2 | 1/2010 | Hudgeons et al. |
| 7,669,128 B2 | 2/2010 | Bailey et al. |
| 7,694,320 B1 | 4/2010 | Yeo et al. |
| 7,779,438 B2 | 8/2010 | Davies |
| 7,787,973 B2 | 8/2010 | Lambert |
| 7,917,505 B2 | 3/2011 | van Gent et al. |
| 8,024,762 B2 | 9/2011 | Britt |
| 8,046,801 B2 | 10/2011 | Ellis et al. |
| 8,065,710 B2 | 11/2011 | Malik |
| 8,151,139 B1 | 4/2012 | Gordon |
| 8,176,425 B2 | 5/2012 | Wallace et al. |
| 8,190,001 B2 | 5/2012 | Bernsley |
| 8,202,167 B2 | 6/2012 | Ackley et al. |
| 8,276,058 B2 | 9/2012 | Gottlieb et al. |
| 8,281,355 B1 | 10/2012 | Weaver et al. |
| 8,321,905 B1 | 11/2012 | Streeter et al. |
| 8,341,662 B1 | 12/2012 | Bassett et al. |
| 8,350,908 B2 | 1/2013 | Morris et al. |
| 8,405,706 B2 | 3/2013 | Zhang et al. |
| 8,600,220 B2 | 12/2013 | Bloch et al. |
| 8,612,517 B1 | 12/2013 | Yadid et al. |
| 8,626,337 B2 | 1/2014 | Corak et al. |
| 8,646,020 B2 | 2/2014 | Reisman |
| 8,650,489 B1 | 2/2014 | Baum et al. |
| 8,667,395 B2 | 3/2014 | Hosogai et al. |
| 8,750,682 B1 | 6/2014 | Nicksay et al. |
| 8,752,087 B2 | 6/2014 | Begeja et al. |
| 8,826,337 B2 | 9/2014 | Issa et al. |
| 8,860,882 B2 | 10/2014 | Bloch et al. |
| 8,930,975 B2 | 1/2015 | Woods et al. |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,082,092 B1 | 7/2015 | Henry |
| 9,094,718 B2 | 7/2015 | Barton et al. |
| 9,190,110 B2 | 11/2015 | Bloch |
| 9,257,148 B2 | 2/2016 | Bloch et al. |
| 9,268,774 B2 | 2/2016 | Kim et al. |
| 9,271,015 B2 | 2/2016 | Bloch et al. |
| 9,363,464 B2 | 6/2016 | Alexander |
| 9,367,196 B1 | 6/2016 | Goldstein et al. |
| 9,374,411 B1 | 6/2016 | Goetz |
| 9,390,099 B1 | 7/2016 | Wang et al. |
| 9,456,247 B1 | 9/2016 | Pontual et al. |
| 9,465,435 B1 | 10/2016 | Zhang et al. |
| 9,473,582 B1 | 10/2016 | Fraccaroli |
| 9,497,496 B1 | 11/2016 | Corley et al. |
| 9,510,044 B1 | 11/2016 | Pereira et al. |
| 9,520,155 B2 | 12/2016 | Bloch et al. |
| 9,530,454 B2 | 12/2016 | Bloch et al. |
| 9,531,998 B1 | 12/2016 | Farrell et al. |
| 9,538,219 B2 | 1/2017 | Sakata et al. |
| 9,554,061 B1 | 1/2017 | Proctor, Jr. et al. |
| 9,571,877 B2 | 2/2017 | Lee et al. |
| 9,607,655 B2 | 3/2017 | Bloch et al. |
| 9,641,898 B2 | 5/2017 | Bloch et al. |
| 9,653,115 B2 | 5/2017 | Bloch et al. |
| 9,653,116 B2 | 5/2017 | Paulraj et al. |
| 9,672,868 B2 | 6/2017 | Bloch et al. |
| 9,715,901 B1 | 7/2017 | Singh et al. |
| 9,736,503 B1 | 8/2017 | Bakshi et al. |
| 9,792,026 B2 | 10/2017 | Bloch et al. |
| 9,792,957 B2 | 10/2017 | Bloch et al. |
| 9,826,285 B1 | 11/2017 | Mishra et al. |
| 9,967,621 B2 | 5/2018 | Armstrong et al. |
| 10,070,192 B2 | 9/2018 | Baratz |
| 10,178,304 B1 | 1/2019 | Tudor et al. |
| 10,178,421 B2 | 1/2019 | Thomas et al. |
| 10,187,687 B2 | 1/2019 | Harb et al. |
| 10,194,189 B1 | 1/2019 | Goetz et al. |
| 10,257,572 B2 | 4/2019 | Manus et al. |
| 10,257,578 B1 | 4/2019 | Bloch et al. |
| 10,310,697 B2 | 6/2019 | Roberts et al. |
| 10,419,790 B2 | 9/2019 | Gersten |
| 10,460,765 B2 | 10/2019 | Bloch et al. |
| 10,523,982 B2 | 12/2019 | Oyman |
| 10,771,824 B1 | 9/2020 | Haritaoglu et al. |
| 10,856,049 B2 | 12/2020 | Bloch et al. |
| 11,003,748 B2 | 5/2021 | Oliker et al. |
| 2001/0056427 A1 | 12/2001 | Yoon et al. |
| 2002/0019799 A1 | 2/2002 | Ginsberg et al. |
| 2002/0029218 A1 | 3/2002 | Bentley et al. |
| 2002/0052891 A1 | 5/2002 | Michaud et al. |
| 2002/0053089 A1 | 5/2002 | Massey |
| 2002/0086724 A1 | 7/2002 | Miyaki et al. |
| 2002/0089523 A1 | 7/2002 | Hodgkinson |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0120931 A1 | 8/2002 | Huber et al. |
| 2002/0124250 A1 | 9/2002 | Proehl et al. |
| 2002/0129374 A1 | 9/2002 | Freeman et al. |

(56) References Cited

U.S. PATENT DOCUMENTS

| | | |
|---|---|---|
| 2002/0140719 A1 | 10/2002 | Amir et al. |
| 2002/0144262 A1 | 10/2002 | Plotnick et al. |
| 2002/0174430 A1 | 11/2002 | Ellis et al. |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0012409 A1 | 1/2003 | Overton et al. |
| 2003/0020744 A1 | 1/2003 | Ellis et al. |
| 2003/0023757 A1 | 1/2003 | Ishioka et al. |
| 2003/0039471 A1 | 2/2003 | Hashimoto |
| 2003/0069057 A1 | 4/2003 | DeFrees-Parrott |
| 2003/0076347 A1 | 4/2003 | Barrett et al. |
| 2003/0101164 A1 | 5/2003 | Pic et al. |
| 2003/0148806 A1 | 8/2003 | Weiss |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0009813 A1 | 1/2004 | Wind |
| 2004/0019905 A1 | 1/2004 | Fellenstein et al. |
| 2004/0034711 A1 | 2/2004 | Hughes |
| 2004/0070595 A1 | 4/2004 | Atlas et al. |
| 2004/0091848 A1 | 5/2004 | Nemitz |
| 2004/0125124 A1 | 7/2004 | Kim et al. |
| 2004/0128317 A1 | 7/2004 | Sull et al. |
| 2004/0138948 A1 | 7/2004 | Loomis |
| 2004/0146275 A1 | 7/2004 | Takata et al. |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2004/0199923 A1 | 10/2004 | Russek |
| 2004/0261127 A1 | 12/2004 | Freeman et al. |
| 2005/0019015 A1 | 1/2005 | Ackley et al. |
| 2005/0028193 A1 | 2/2005 | Candelore et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0105888 A1 | 5/2005 | Hamada et al. |
| 2005/0107159 A1 | 5/2005 | Sato |
| 2005/0120389 A1 | 6/2005 | Boss et al. |
| 2005/0132401 A1 | 6/2005 | Boccon-Gibod et al. |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0240955 A1 | 10/2005 | Hudson |
| 2005/0251820 A1 | 11/2005 | Stefanik et al. |
| 2005/0251827 A1 | 11/2005 | Ellis et al. |
| 2005/0289582 A1 | 12/2005 | Tavares et al. |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0080167 A1 | 4/2006 | Chen et al. |
| 2006/0089843 A1 | 4/2006 | Flather |
| 2006/0120624 A1 | 6/2006 | Jojic et al. |
| 2006/0130121 A1 | 6/2006 | Candelore et al. |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0161954 A1 | 7/2006 | Hamada et al. |
| 2006/0200842 A1 | 9/2006 | Chapman et al. |
| 2006/0212904 A1 | 9/2006 | Klarfeld et al. |
| 2006/0222322 A1 | 10/2006 | Levitan |
| 2006/0224260 A1 | 10/2006 | Hicken et al. |
| 2006/0253330 A1 | 11/2006 | Maggio et al. |
| 2006/0274828 A1 | 12/2006 | Siemens et al. |
| 2007/0003149 A1 | 1/2007 | Nagumo et al. |
| 2007/0018980 A1 | 1/2007 | Berteig et al. |
| 2007/0024706 A1 | 2/2007 | Brannon et al. |
| 2007/0028272 A1 | 2/2007 | Lockton |
| 2007/0033633 A1 | 2/2007 | Andrews et al. |
| 2007/0055989 A1 | 3/2007 | Shanks et al. |
| 2007/0079325 A1 | 4/2007 | de Heer |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1 | 7/2007 | Ben-Yaacov et al. |
| 2007/0180488 A1 | 8/2007 | Walter et al. |
| 2007/0220583 A1 | 9/2007 | Bailey et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0001956 A1 | 1/2008 | Markovic et al. |
| 2008/0019445 A1 | 1/2008 | Aono et al. |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0139301 A1 | 6/2008 | Holthe |
| 2008/0148152 A1 | 6/2008 | Blinnikka et al. |
| 2008/0161111 A1 | 7/2008 | Schuman |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0238938 A1 | 10/2008 | Eklund et al. |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0027337 A1 | 1/2009 | Hildreth |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0063995 A1 | 3/2009 | Baron et al. |
| 2009/0077137 A1 | 3/2009 | Weda et al. |
| 2009/0079663 A1 | 3/2009 | Chang et al. |
| 2009/0083631 A1 | 3/2009 | Sidi et al. |
| 2009/0116817 A1 | 5/2009 | Kim et al. |
| 2009/0131764 A1 | 5/2009 | Lee et al. |
| 2009/0133051 A1 | 5/2009 | Hildreth |
| 2009/0133071 A1 | 5/2009 | Sakai et al. |
| 2009/0138805 A1 | 5/2009 | Hildreth |
| 2009/0177538 A1 | 7/2009 | Brewer et al. |
| 2009/0178089 A1 | 7/2009 | Picco et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0210790 A1 | 8/2009 | Thomas |
| 2009/0226046 A1 | 9/2009 | Shteyn |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265737 A1 | 10/2009 | Issa et al. |
| 2009/0265746 A1 | 10/2009 | Halen et al. |
| 2009/0282454 A1 | 11/2009 | Ekstrand |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0070987 A1 | 3/2010 | Amento et al. |
| 2010/0077290 A1 | 3/2010 | Pueyo |
| 2010/0088726 A1* | 4/2010 | Curtis .............. G11B 27/034 725/45 |
| 2010/0122286 A1 | 5/2010 | Begeja et al. |
| 2010/0146145 A1 | 6/2010 | Tippin et al. |
| 2010/0153512 A1 | 6/2010 | Balassanian et al. |
| 2010/0153885 A1 | 6/2010 | Yates |

(56) References Cited

U.S. PATENT DOCUMENTS

| | | |
|---|---|---|
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0199299 A1 | 8/2010 | Chang et al. |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293073 A1 | 11/2010 | Schmidt |
| 2010/0293455 A1 | 11/2010 | Bloch |
| 2010/0312670 A1 | 12/2010 | Dempsey |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0060993 A1 | 3/2011 | Cotter et al. |
| 2011/0069940 A1 | 3/2011 | Shimy et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0125512 A1 | 5/2011 | Huang |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0182366 A1 | 7/2011 | Frojdh et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0239246 A1 | 9/2011 | Woodward et al. |
| 2011/0246661 A1 | 10/2011 | Manzari et al. |
| 2011/0246885 A1 | 10/2011 | Pantos et al. |
| 2011/0252031 A1 | 10/2011 | Blumenthal et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0293240 A1 | 12/2011 | Newton et al. |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0011438 A1 | 1/2012 | Kim et al. |
| 2012/0017141 A1 | 1/2012 | Eelen et al. |
| 2012/0062576 A1 | 3/2012 | Rosenthal et al. |
| 2012/0072420 A1 | 3/2012 | Moganti et al. |
| 2012/0081389 A1 | 4/2012 | Dilts |
| 2012/0089911 A1 | 4/2012 | Hosking et al. |
| 2012/0090000 A1 | 4/2012 | Cohen et al. |
| 2012/0094768 A1 | 4/2012 | McCaddon et al. |
| 2012/0105723 A1 | 5/2012 | van Coppenolle et al. |
| 2012/0110618 A1 | 5/2012 | Kilar et al. |
| 2012/0110620 A1 | 5/2012 | Kilar et al. |
| 2012/0117145 A1 | 5/2012 | Clift et al. |
| 2012/0120114 A1 | 5/2012 | You et al. |
| 2012/0134646 A1 | 5/2012 | Alexander |
| 2012/0137015 A1 | 5/2012 | Sun |
| 2012/0147954 A1 | 6/2012 | Kasai et al. |
| 2012/0159530 A1 | 6/2012 | Ahrens et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0198489 A1 | 8/2012 | O'Connell et al. |
| 2012/0213495 A1 | 8/2012 | Hafeneger et al. |
| 2012/0225693 A1 | 9/2012 | Sirpal et al. |
| 2012/0233631 A1 | 9/2012 | Geshwind |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1 | 1/2013 | Johnson et al. |
| 2013/0024888 A1 | 1/2013 | Sivertsen |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0033542 A1 | 2/2013 | Nakazawa |
| 2013/0036200 A1 | 2/2013 | Roberts et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0094830 A1 | 4/2013 | Stone et al. |
| 2013/0097410 A1 | 4/2013 | Bourges-Sevenier |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0167168 A1 | 6/2013 | Ellis et al. |
| 2013/0173765 A1 | 7/2013 | Korbecki |
| 2013/0177294 A1 | 7/2013 | Kennberg |
| 2013/0188923 A1 | 7/2013 | Hartley et al. |
| 2013/0195427 A1 | 8/2013 | Sathish |
| 2013/0202265 A1 | 8/2013 | Arrasvuori et al. |
| 2013/0204710 A1 | 8/2013 | Boland et al. |
| 2013/0205314 A1 | 8/2013 | Ramaswamy et al. |
| 2013/0219425 A1 | 8/2013 | Swartz |
| 2013/0235152 A1 | 9/2013 | Hannuksela et al. |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0268620 A1 | 10/2013 | Osminer |
| 2013/0271453 A1 | 10/2013 | Ruotsalainen et al. |
| 2013/0282917 A1 | 10/2013 | Reznik et al. |
| 2013/0283401 A1 | 10/2013 | Pabla et al. |
| 2013/0290818 A1 | 10/2013 | Arrasvuori et al. |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025620 A1 | 1/2014 | Greenzeiger et al. |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0105420 A1 | 4/2014 | Lee |
| 2014/0109165 A1 | 4/2014 | Friedman |
| 2014/0115114 A1 | 4/2014 | Garmark et al. |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0143298 A1 | 5/2014 | Klotzer et al. |
| 2014/0152564 A1 | 6/2014 | Gulezian et al. |
| 2014/0156677 A1 | 6/2014 | Collins, III et al. |

(56) References Cited

U.S. PATENT DOCUMENTS

| | | | |
|---|---|---|---|
| 2014/0161417 A1* | 6/2014 | Kurupacheril | H04N 21/4828 386/241 |
| 2014/0178051 A1 | 6/2014 | Bloch et al. | |
| 2014/0186008 A1* | 7/2014 | Eyer | H04N 21/482 386/240 |
| 2014/0194211 A1 | 7/2014 | Chimes et al. | |
| 2014/0210860 A1 | 7/2014 | Caissy | |
| 2014/0219630 A1 | 8/2014 | Minder | |
| 2014/0220535 A1 | 8/2014 | Angelone | |
| 2014/0237520 A1 | 8/2014 | Rothschild et al. | |
| 2014/0245152 A1* | 8/2014 | Carter | G11B 27/28 715/720 |
| 2014/0270680 A1 | 9/2014 | Bloch et al. | |
| 2014/0279032 A1 | 9/2014 | Roever et al. | |
| 2014/0282013 A1 | 9/2014 | Amijee | |
| 2014/0282642 A1 | 9/2014 | Needham et al. | |
| 2014/0298173 A1 | 10/2014 | Rock | |
| 2014/0314239 A1 | 10/2014 | Meyer et al. | |
| 2014/0317638 A1 | 10/2014 | Hayes | |
| 2014/0380167 A1 | 12/2014 | Bloch et al. | |
| 2015/0007234 A1 | 1/2015 | Rasanen et al. | |
| 2015/0012369 A1 | 1/2015 | Dharmaji et al. | |
| 2015/0015789 A1 | 1/2015 | Guntur et al. | |
| 2015/0020086 A1 | 1/2015 | Chen et al. | |
| 2015/0033266 A1 | 1/2015 | Klappert et al. | |
| 2015/0046946 A1 | 2/2015 | Hassell et al. | |
| 2015/0058342 A1 | 2/2015 | Kim et al. | |
| 2015/0063781 A1 | 3/2015 | Silverman et al. | |
| 2015/0067596 A1 | 3/2015 | Brown et al. | |
| 2015/0067723 A1 | 3/2015 | Bloch et al. | |
| 2015/0070458 A1 | 3/2015 | Kim et al. | |
| 2015/0070516 A1 | 3/2015 | Shoemake et al. | |
| 2015/0074721 A1 | 3/2015 | Fishman et al. | |
| 2015/0086174 A1* | 3/2015 | Abecassis | H04N 21/8358 386/201 |
| 2015/0104144 A1 | 4/2015 | Minemura | |
| 2015/0104155 A1 | 4/2015 | Bloch et al. | |
| 2015/0106845 A1 | 4/2015 | Popkiewicz et al. | |
| 2015/0124171 A1 | 5/2015 | King | |
| 2015/0154439 A1 | 6/2015 | Anzue et al. | |
| 2015/0160853 A1 | 6/2015 | Hwang et al. | |
| 2015/0179224 A1 | 6/2015 | Bloch et al. | |
| 2015/0181271 A1 | 6/2015 | Onno et al. | |
| 2015/0181291 A1 | 6/2015 | Wheatley | |
| 2015/0181301 A1 | 6/2015 | Bloch et al. | |
| 2015/0185965 A1* | 7/2015 | Belliveau | G11B 27/007 715/723 |
| 2015/0195601 A1 | 7/2015 | Hahm | |
| 2015/0199116 A1 | 7/2015 | Bloch et al. | |
| 2015/0201187 A1 | 7/2015 | Ryo | |
| 2015/0228307 A1 | 8/2015 | Cabanero | |
| 2015/0256861 A1 | 9/2015 | Oyman | |
| 2015/0258454 A1 | 9/2015 | King et al. | |
| 2015/0278986 A1 | 10/2015 | Edwin et al. | |
| 2015/0286716 A1 | 10/2015 | Snibbe et al. | |
| 2015/0293675 A1 | 10/2015 | Bloch et al. | |
| 2015/0294685 A1 | 10/2015 | Bloch et al. | |
| 2015/0304698 A1 | 10/2015 | Redol | |
| 2015/0310660 A1 | 10/2015 | Mogilefsky et al. | |
| 2015/0318018 A1 | 11/2015 | Kaiser et al. | |
| 2015/0331485 A1 | 11/2015 | Wilairat et al. | |
| 2015/0331933 A1 | 11/2015 | Tocchini, IV et al. | |
| 2015/0331942 A1 | 11/2015 | Tan | |
| 2015/0348325 A1 | 12/2015 | Voss | |
| 2015/0373385 A1 | 12/2015 | Straub | |
| 2016/0009487 A1 | 1/2016 | Edwards et al. | |
| 2016/0021412 A1 | 1/2016 | Zito, Jr. | |
| 2016/0029002 A1 | 1/2016 | Balko | |
| 2016/0037217 A1 | 2/2016 | Harmon et al. | |
| 2016/0057497 A1 | 2/2016 | Kim et al. | |
| 2016/0062540 A1 | 3/2016 | Yang et al. | |
| 2016/0065831 A1 | 3/2016 | Howard et al. | |
| 2016/0066051 A1 | 3/2016 | Caidar et al. | |
| 2016/0086585 A1 | 3/2016 | Sugimoto | |
| 2016/0094875 A1 | 3/2016 | Peterson et al. | |
| 2016/0099024 A1* | 4/2016 | Gilley | H04N 21/42646 386/282 |
| 2016/0100226 A1 | 4/2016 | Sadler et al. | |
| 2016/0104513 A1 | 4/2016 | Bloch et al. | |
| 2016/0105724 A1 | 4/2016 | Bloch et al. | |
| 2016/0132203 A1 | 5/2016 | Seto et al. | |
| 2016/0134946 A1 | 5/2016 | Glover et al. | |
| 2016/0142889 A1 | 5/2016 | O'Connor et al. | |
| 2016/0150278 A1 | 5/2016 | Greene | |
| 2016/0162179 A1 | 6/2016 | Annett et al. | |
| 2016/0170948 A1 | 6/2016 | Bloch | |
| 2016/0173944 A1 | 6/2016 | Kilar et al. | |
| 2016/0192009 A1 | 6/2016 | Sugio et al. | |
| 2016/0217829 A1 | 7/2016 | Bloch et al. | |
| 2016/0224573 A1 | 8/2016 | Shahraray et al. | |
| 2016/0232579 A1 | 8/2016 | Fahnestock | |
| 2016/0277779 A1 | 9/2016 | Zhang et al. | |
| 2016/0303608 A1 | 10/2016 | Jossick | |
| 2016/0321689 A1 | 11/2016 | Turgeman | |
| 2016/0322054 A1 | 11/2016 | Bloch et al. | |
| 2016/0323608 A1 | 11/2016 | Bloch et al. | |
| 2016/0337691 A1 | 11/2016 | Prasad et al. | |
| 2016/0344873 A1 | 11/2016 | Jenzeh et al. | |
| 2016/0365117 A1 | 12/2016 | Boliek et al. | |
| 2016/0366454 A1 | 12/2016 | Tatourian et al. | |
| 2017/0006322 A1 | 1/2017 | Dury et al. | |
| 2017/0032562 A1 | 2/2017 | Block et al. | |
| 2017/0041372 A1 | 2/2017 | Hosur | |
| 2017/0062012 A1 | 3/2017 | Bloch et al. | |
| 2017/0142486 A1 | 5/2017 | Masuda | |
| 2017/0149795 A1 | 5/2017 | Day, II | |
| 2017/0178409 A1 | 6/2017 | Bloch et al. | |
| 2017/0178601 A1 | 6/2017 | Bloch et al. | |
| 2017/0185596 A1 | 6/2017 | Spirer | |
| 2017/0195736 A1 | 7/2017 | Chai et al. | |
| 2017/0264920 A1 | 9/2017 | Mickelsen | |
| 2017/0286424 A1 | 10/2017 | Peterson | |
| 2017/0289220 A1 | 10/2017 | Bloch et al. | |
| 2017/0295410 A1 | 10/2017 | Bloch et al. | |
| 2017/0326462 A1 | 11/2017 | Lyons et al. | |
| 2017/0337196 A1 | 11/2017 | Goela et al. | |
| 2017/0345460 A1 | 11/2017 | Bloch et al. | |
| 2018/0007443 A1 | 1/2018 | Cannistraro et al. | |
| 2018/0014049 A1 | 1/2018 | Griffin et al. | |
| 2018/0025078 A1 | 1/2018 | Quennesson | |
| 2018/0048831 A1 | 2/2018 | Berwick et al. | |
| 2018/0060430 A1 | 3/2018 | Lu | |
| 2018/0068019 A1 | 3/2018 | Novikoff et al. | |
| 2018/0095645 A1 | 4/2018 | Subudhi et al. | |
| 2018/0115592 A1 | 4/2018 | Samineni | |
| 2018/0130501 A1 | 5/2018 | Bloch et al. | |
| 2018/0176573 A1 | 6/2018 | Chawla et al. | |
| 2018/0191574 A1 | 7/2018 | Vishnia et al. | |
| 2018/0254067 A1 | 9/2018 | Elder | |
| 2018/0262798 A1 | 9/2018 | Ramachandra | |
| 2018/0300852 A1 | 10/2018 | Chen et al. | |
| 2018/0300858 A1 | 10/2018 | Chen et al. | |
| 2018/0310049 A1 | 10/2018 | Takahashi et al. | |
| 2018/0314959 A1 | 11/2018 | Apokatanidis et al. | |
| 2018/0376205 A1 | 12/2018 | Oswal et al. | |
| 2019/0005716 A1 | 1/2019 | Singh et al. | |
| 2019/0066188 A1 | 2/2019 | Rothschild | |
| 2019/0069038 A1 | 2/2019 | Phillips | |
| 2019/0069039 A1 | 2/2019 | Phillips | |
| 2019/0075367 A1 | 3/2019 | van Zessen et al. | |
| 2019/0090002 A1 | 3/2019 | Ramadorai et al. | |
| 2019/0098371 A1 | 3/2019 | Keesan | |
| 2019/0104342 A1 | 4/2019 | Catalano et al. | |
| 2019/0132639 A1 | 5/2019 | Panchaksharaiah et al. | |
| 2019/0139314 A1 | 5/2019 | Marsh et al. | |
| 2019/0166412 A1 | 5/2019 | Panchaksharaiah et al. | |
| 2019/0182525 A1 | 6/2019 | Steinberg et al. | |
| 2019/0238719 A1 | 8/2019 | Alameh et al. | |
| 2019/0335225 A1 | 10/2019 | Fang et al. | |
| 2019/0354936 A1 | 11/2019 | Deluca et al. | |
| 2020/0023157 A1 | 1/2020 | Lewis et al. | |
| 2020/0029128 A1 | 1/2020 | Erskine | |
| 2020/0037047 A1 | 1/2020 | Cheung et al. | |

(56) References Cited

U.S. PATENT DOCUMENTS

| | | |
|---|---|---|
| 2020/0059699 A1 | 2/2020 | Malev et al. |
| 2020/0169787 A1 | 5/2020 | Pearce et al. |
| 2020/0193163 A1 | 6/2020 | Chang et al. |
| 2020/0344508 A1 | 10/2020 | Edwards et al. |
| 2021/0263564 A1 | 8/2021 | Chen et al. |
| 2022/0046291 A1 | 2/2022 | Jiang et al. |
| 2022/0245209 A1 | 8/2022 | Cho et al. |

FOREIGN PATENT DOCUMENTS

| | | |
|---|---|---|
| DE | 10053720 A1 | 4/2002 |
| EP | 0965371 A2 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2003-245471 A | 9/2003 |
| JP | 2008-005288 A | 1/2008 |
| KR | 2004-0005068 A | 1/2004 |
| KR | 2010-0037413 A | 4/2010 |
| WO | WO-1996/013810 A1 | 5/1996 |
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009/125404 A2 | 10/2009 |
| WO | WO-2009/137919 A1 | 11/2009 |

OTHER PUBLICATIONS

U.S. Appl. No. 16/986,977 Published as US2020/0365187, Systems and Methods for Creating Linear Video From Branched Video, filed Aug. 6, 2020.

U.S. Appl. No. 16/865,896 U.S. Pat. No. 10,885,944 Published as US2020/0265870, Systems and Methods for Dynamic Video Bookmarking, filed May 4, 2020.

U.S. Appl. No. 17/138,434 Published as US2021/0366520, Systems and Methods for Dynamic Video Bookmarking, filed Dec. 30, 2020.

U.S. Appl. No. 14/534,626 Published as US2016/0105724, Systems and Methods for Parallel Track Transitions, filed Nov. 6, 2014.

U.S. Appl. No. 14/700,845 U.S. Pat. No. 10,582,265 Published as US2016/0323608, Systems and Methods for Nonlinear Video Playback Using Linear Real-Time Video Players, filed Apr. 30, 2015.

U.S. Appl. No. 16/752,193 Published as US2020/0404382, Systems and Methods for Nonlinear Video Playback Using Linear Real-Time Video Players, filed Jan. 24, 2020.

U.S. Appl. No. 15/165,373, Symbiotic Interactive Video, filed May 26, 2016.

U.S. Appl. No. 15/395,477 Published as US2021/0281626, Systems and Methods for Dynamic Weighting of Branched Video Paths, filed Dec. 30, 2016.

U.S. Appl. No. 15/997,284 Published as US2019/0373330, Interactive Video Dynamic Adaptation and User Profiling, filed Jun. 4, 2018.

U.S. Appl. No. 17/091,149 Published as US2021/0306707, Dynamic Library Display for Interactive Videos, filed Nov. 6, 2020.

U.S. Appl. No. 16/591,103 Published as US2021/0105433, Systems and Methods for Dynamically Adjusting Video Aspect Ratios, filed Oct. 2, 2019.

U.S. Appl. No. 16/793,201 Published as US2021/0258640, Systems and Methods for Detecting Anomalous Activities for Interactive Videos, filed Feb. 18, 2020.

U.S. Appl. No. 17/462,199, Shader-based dynamic video manipulation, filed Aug. 31, 2021.

U.S. Appl. No. 17/462,222, Shader-based dynamic video manipulation, filed Aug. 31, 2021.

U.S. Appl. No. 17/334,027, Automated platform for generating interactive videos, filed May 28, 2021.

U.S. Appl. No. 17/484,604, Discovery engine for interactive videos, filed Sep. 24, 2021.

U.S. Appl. No. 17/484,635, Video player integration within websites, filed Sep. 24, 2021.

An ffmpeg and SDL Tutorial, "Tutorial 05: Synching Video," Retrieved from internet on Mar. 15, 2013: <http://dranqer.com/ffmpeg/tutorial05.html>, 4 pages.

Archos Gen 5 English User Manual Version 3.0, Jul. 26, 2007, pp. 1-81.

Barlett M, (2008), "iTunes 11: How to Queue Next Song," *Technipages*, Oct. 6, 2008 issue, pp. 1-8, retrieved on Dec. 26, 2013 from the internet: http://www.technipages.com/itunes-queue-next-song.html.

Google Scholar search, "Inserting metadata inertion advertising video", Jul. 16, 2021, 2 pages.

International Preliminary Report and Written Opinion of PCT/IL2012/000080 dated Aug. 27, 2013, 7 pages.

International Search Report and Written Opinion for International Patent Application PCT/IB2013/001000 dated Jul. 31, 2013 (5 pages).

International Search Report for International Patent Application PCT/IL2010/000362 dated Aug. 25, 2010 (2 pages).

International Search Report for International Patent Application PCT/IL2012/000081 dated Jun. 28, 2012 (4 pages).

International Search Report of PCT/IL2012/000080 dated Aug. 9, 2012, 4 pages.

Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-6).

Marciel, M. et al., "Understanding the Detection of View Fraud in Video Content Portals", (Feb. 5, 2016), Cornell University, pp. 1-13.

Miller, Gregor et al., "MiniDiver: A Novel Mobile Media Playback Interface for Rich Video Content on an iPhoneTM", Entertainment Computing A ICEC 2009, Sep. 3, 2009, pp. 98-109.

Sodagar, I., "The MPEG-DASH Standard for Multimedia Streaming Over the Internet", IEEE Multimedia, IEEE Service Center, New York, NY US, (2011) 18(4): 62-67.

Supplemental European Search Report for EP10774637.2 (PCT/IL2010/000362) dated Jun. 28, 2012 (7 pages).

Supplemental European Search Report for EP13184145, (dated Jan. 30, 2014), 5 pages.

Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).

U.S. Appl. No. 12/706,721 U.S. Pat. No. 9,190,110 Published as US2010/0293455, System and Method for Assembling a Recorded Composition, filed Feb. 17, 2010.

U.S. Appl. No. 14/884,285 U.S. Pat. No. 11,314,936 Published as US2017/0178601, Systems and Method for Assembling a Recorded Composition, filed Oct. 15, 2015.

U.S. Appl. No. 13/033,916 U.S. Pat. No. 9,607,655 Published as US2011/0200116, System and Method for Seamless Multimedia Assembly, filed Feb. 24, 2011.

U.S. Appl. No. 13/034,645 U.S. Pat. No. 11,232,458 Published as US2011/0202562, System and Method for Data Mining Within Interactive Multimedia, filed Feb. 24, 2011.

U.S. Appl. No. 17/551,847 Published as US2021/0366520, Systems and Methods for Data Mining Within Interactive Multimedia, filed Dec. 15, 2021.

U.S. Appl. No. 13/437,164 U.S. Pat. No. 8,600,220 Published as US2013/0259442, Systems and Methods for Loading More Than One Video Content at a Time, filed Apr. 2, 2012.

U.S. Appl. No. 14/069,694 U.S. Pat. No. 9,271,015 Published as US2014/0178051, Systems and Methods for Loading More Than One Video Content at a Time, filed Nov. 1, 2013.

U.S. Appl. No. 13/622,780 U.S. Pat. No. 8,860,882 Published as US2014/0078397, Systems and Methods for Constructing Multimedia Content Modules, filed Sep. 19, 2012.

U.S. Appl. No. 13/622,795 U.S. Pat. No. 9,009,619 Published as US2014/0082666, Progress Bar for Branched Videos, filed Sep. 19, 2012.

(56) References Cited

OTHER PUBLICATIONS

U.S. Appl. No. 14/639,579 U.S. Pat. No. 10,474,334 Published as US2015/0199116, Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821 U.S. Pat. No. 10,418,066 Published as US2016/0217829, System and Method for Synchronization of Selectably Presentable Media Streams, filed Dec. 30, 2015.
U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.
U.S. Appl. No. 14/107,600 U.S. Pat. No. 10,448,119 Published as US2015/0067723, Methods and Systems for Unfolding Video Pre-Roll, filed Dec. 16, 2013.
U.S. Appl. No. 14/335,381 U.S. Pat. No. 9,530,454 Published as US2015/0104155, Systems and Methods for Real-Time Pixel Switching, filed Jul. 18, 2014.
U.S. Appl. No. 14/139,996 U.S. Pat. No. 9,641,898 Published as US2015/0181301, Methods and Systems for In-Video Library, filed Dec. 24, 2013.
U.S. Appl. No. 14/140,007 U.S. Pat. No. 9,520,155 Published as US2015/0179224, Methods and Systems for Seeking to Non-Key Frames, filed Dec. 24, 2013.
U.S. Appl. No. 14/249,627 U.S. Pat. No. 9,653,115 Published as US2015-0294685, Systems and Methods for Creating Linear Video From Branched Video, filed Apr. 10, 2014.
U.S. Appl. No. 15/481,916 U.S. Pat. No. 10,755,747 Published as US2017-0345460, Systems and Methods for Creating Linear Video From Branched Video, filed Apr. 7, 2017.
U.S. Appl. No. 16/986,977 U.S Pat. No. 11,501,802 Published as US2020/0365187, Systems and Methods for Creating Linear Video From Branched Video, filed Aug. 6, 2020.
U.S. Appl. No. 14/249,665 U.S. Pat. No. 9,792,026 Published as US2015/0293675, Dynamic Timeline for Branched Video, filed Apr. 10, 2014.
U.S. Appl. No. 14/509,700 U.S. Pat. No. 9,792,957 Published as US2016/0104513, Systems and Methods for Dynamic Video Bookmarking, filed Oct. 8, 2014.
U.S. Appl. No. 14/534,626 U.S. Pat. No. 10,692,540 Published as US-2018-0130501-A1, Systems and Methods for Dynamic Video Bookmarking, filed Sep. 13, 2017.
U.S. Appl. No. 16/865,896 U.S. Pat. No. 10,885,944 Published as U52020/0265870, Systems and Methods for Dynamic Video Bookmarking, filed May 4, 2020.
U.S. Appl. No. 17/138,434 U.S. Pat. No. 11,348,618 Published as U52021/0366520, Systems and Methods for Dynamic Video Bookmarking, filed Dec. 30, 2020.
U.S. Appl. No. 14/534,626 U.S. Pat. No. 11,412,276 Published as US2016/0105724, Systems and Methods for Parallel Track Transitions, filed Mar. 31, 2022.
U.S. Appl. No. 14/700,845 U.S. Pat. No. 10,582,265 Published as U52016/0323608, Systems and Methods for Nonlinear Video Playback Using Linear Real-Time Video Players, filed Apr. 30, 2015.
U.S. Appl. No. 16/752,193 Published as U52020/0404382, Systems and Methods for Nonlinear Video Playback Using Linear Real-Time Video Players, filed Jan. 24, 2020.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 U.S. Pat. No. 10,460,765 Published as US2017/0062012, Systems and Methods for Adaptive and Responsive Video, filed Aug. 26, 2015.

U.S. Appl. No. 16/559,082 Published as US2019/0392868, Systems and Methods for Adaptive and Responsive Video, filed Sep. 3, 2019.
U.S. Appl. No. 14/978,464 U.S. Pat. No. 11,164,548 Published as US2017/0178601, Intelligent Buffering of Large-Scale Video, filed Dec. 22, 2015.
U.S. Appl. No. 14/978,491 U.S. Pat. No. 11,128,853 Published as US2017/0178409, Seamless Transitions in Large-Scale Video, filed Dec. 22, 2015.
U.S. Appl. No. 17/403,703 Published as US2022/0038673, Seamless Transitions in Large-Scale Video, filed Aug. 16, 2021.
U.S. Appl. No. 15/085,209 U.S. Pat. No. 10,462,202 Published as US2017/0289220, Media Stream Rate Synchronization, filed Mar. 30, 2016.
U.S. Appl. No. 15/165,373 Published as US2017/0295410, Symbiotic Interactive Video, filed May 26, 2016.
U.S. Appl. No. 15/189,931 U.S. Pat. No. 10,218,760 Published as US2017/0374120, Dynamic Summary Generation for Realtime Switchable Videos, filed Jun. 22, 2016.
U.S. Appl. No. 15/395,477 U.S. Pat. No. 11,050,809 Published as US2018/0191574, Systems and Methods for Dynamic Weighting of Branched Video Paths, filed Dec. 30, 2016.
U.S. Appl. No. 17/328,261 U.S. Pat. No. 11,553,024 Published as US2021/0281626, Systems and Methods for Dynamic Weighting of Branched Video Paths, filed May 24, 2021.
U.S. Appl. No. 15/997,284 U.S. Pat. No. 11,601,721 Published as US2019/0373330, Interactive video dynamic adaption and user profiling, filed Jun. 4, 2018.
U.S. Appl. No. 15/863,191 U.S. Pat. No. 10,257,578, Dynamic Library Display for Interactive Videos, filed Jan. 5, 2018.
U.S. Appl. No. 16/283,066 U.S. Pat. No. 10,856,049 Published as US2019/0349637, Dynamic Library Display for Interactive Videos, filed Feb. 22, 2019.
U.S. Appl. No. 17/091,149 U.S. Pat. No. 11,528,534 Published as US2021/0306707, Dynamic Library Display for Interactive Videos, filed Nov. 6, 2020.
U.S. Appl. No. 16/591,103 U.S. Pat. No. 11,490,047 Published as US2021/0105433, Systems and Methods for Dynamically Adjusting Video Aspect Ratios, filed Oct. 2, 2019.
U.S. Appl. No. 16/793,205 Published as US2021/0258647, Dynamic adaptation of interactive video players using behavioral analytics, filed Feb. 18, 2020.
U.S. Appl. No. 16/793,201 U.S. Pat. No. 11,245,961 Published as US2021/0258640, Systems and Methods for Detecting Anomalous Activities for Interactive Videos, filed Feb. 18, 2020.
U.S. Appl. No. 16/922,540 Published as US2022/0014817, Systems and Methods for Seamless Audio and Video Endpoint Transitions, filed Jul. 7, 2020.
U.S. Appl. No. 17/462,199 Published as US2023/0076702, Shader-based dynamic video manipulation, filed Aug. 31, 2021.
U.S. Appl. No. 17/462,222 Published as US2023/0076000, Shader-based dynamic video manipulation, filed Aug. 31, 2021.
U.S. Appl. No. 17/334,027 Published as US2022/0385982, Automated platform for generating interactive videos, filed May 28, 2021.
U.S. Appl. No. 17/484,604 Published as US2023/0101675, Discovery engine for interactive videos, filed Sep. 24, 2021.
U.S. Appl. No. 17/484,635 Published as US2023/0101763, Video player integration within websites, filed Sep. 24, 2021.
U.S. Appl. No. 18/331,494, Automated Production Plan for Product Videos, filed Jun. 8, 2023.
Bodaghi, A. et al., "Personalization of Interactive Recommender Systems for Expert Users", 4th International Conference on the Web Research (ICWR), (2018), pp. 58-62.

* cited by examiner

SYSTEMS AND METHODS FOR DYNAMIC VIDEO BOOKMARKING

CROSS-REFERENCE TO RELATED APPLICATIONS

This application is a continuation of U.S. patent application Ser. No. 17/138,434, filed Dec. 30, 2020 and entitled "Systems and Methods for Dynamic Video Bookmarking," which is a continuation of U.S. patent application Ser. No. 16/865,896, filed on May 4, 2020 and entitled "Systems and Methods for Dynamic Video Bookmarking," now U.S. Pat. No. 10,885,944, issued on Jan. 5, 2021, which is a continuation of U.S. patent application Ser. No. 15/703,462, filed on Sep. 13, 2017, and entitled "Systems and Methods for Dynamic Video Bookmarking," now U.S. Pat. No. 10,692,540, issued on Jun. 23, 2020, which is a continuation of U.S. patent application Ser. No. 14/509,700, filed on Oct. 8, 2014, and entitled "Systems and Methods for Dynamic Video Bookmarking," now U.S. Pat. No. 9,792,957, issued on Oct. 17, 2017, the entireties of which are incorporated by reference herein.

FIELD OF THE INVENTION

The present disclosure relates generally to video bookmarking and, more particularly, to systems and methods for tracking and saving the path of a user through an interactive video tree such that the choices made by the user in traversing the video tree can be recreated at a later time.

BACKGROUND

Common today are web-based and standalone video players that allow users to mark specific locations in a linear video and restart playback of the video at those locations without having to view the preceding content. For example, the video-sharing website, YouTube, recognizes a time offset parameter in the uniform resource locator (URL) to a video, thereby allowing a user to start the video at the specified offset. Other known video bookmarking techniques operate similarly; that is, they essentially save a timestamp to return the user to a particular location in a video.

SUMMARY

Systems and methods for dynamic bookmarking in interactive video are described. In one aspect, an interactive video is formed based on a video tree structure that is made up of video segments. Each video segment represents a predefined portion of one or more paths in the video tree, with each path being associated with a different video presentation. One of the paths in the video tree is traversed based on the decisions made by a user during playback of the video presentation associated with the path being traversed. A selection of a location in a video segment is made, and a bookmark of the selected location is stored for subsequent retrieval. The bookmark includes information identifying the sequence of video segments in the video tree that was traversed to reach the particular location. When the bookmark is later selected, the user is directed to the bookmarked location in the video segment and, based on the saved sequence of video segments, the decisions made by the user during playback of the video presentation are restored. The video tree structure can be modified, and the bookmark will be automatically updated, if necessary, based on the modified structure of the video tree.

In one implementation, the bookmark includes an offset of the location from the beginning of the first video segment and/or an offset of the location from a decision period. The decision period can be a period during which the user can choose from a plurality of options during playback of a video segment, where a following segment is determined based on a choice made by the user during the decision period. The bookmark can also include a video thumbnail associated with the location.

In another implementation, the decisions are restored with a visual representation of at least one of the sequence of video segments and the decisions being provided.

In a further implementation, a video player for playing the video segments is provided. The video player includes a video progress bar that a user can interact with to select a location in a video segment to create a bookmark.

In one implementation, a second bookmark of a location in the video tree is automatically provided based on historical data, user data, and/or content information. Historical data can include previous decisions made by the user in traversing the video tree, and previous decisions made by a group of users in traversing the video tree. User data can include demographics, geography, and social media information. Content information can include video presentation length, segment length, path length, and content subject matter.

In another implementation, a dynamic bookmark that references a tracked statistic is stored. Upon selection of the dynamic bookmark, a location in the video tree is identified based on the current state of the tracked statistic, and the user is directed to the identified location.

Other aspects of the invention include corresponding systems and computer-readable media. The various aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described herein are various implementations of methods and supporting systems for creating and retrieving bookmarks in interactive videos. In one implementation, the presentation of an interactive video is based on a video tree, hierarchy, or other structure. A video tree can be formed by nodes that are connected in a branching, hierarchical, or other linked form. Nodes can have an associated video segment, audio segment, graphical user interface elements, and/or other associated media. Users (e.g., viewers) can watch a video that begins from a starting node in the tree and proceeds along connected nodes. Upon reaching a point where multiple video segments branch off from a currently viewed segment, the user can interactively select the branch to traverse and, thus, the next video segment to watch. Branched video can include seamlessly assembled and selectably presentable multimedia content such as that described in U.S. patent application Ser. No. 13/033,916, filed on Feb. 24, 2011, and entitled "System and Method for Seamless Multimedia Assembly," and U.S. patent application Ser. No. 14/107,600, filed on Dec. 16, 2013, and entitled "Methods and Systems for Unfolding Video Pre-Roll," the entireties of which are hereby incorporated by reference.

The prerecorded video segments in a video tree can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in certain manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles, preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments form a seamless multimedia content path, and users can take multiple paths and experience a complete, start-to-finish, seamless presentation. Further, one or more multimedia segments can be shared among intertwining paths while still ensuring a seamless transition from a previous segment and to the next segment. The content paths can be predefined, with fixed sets of possible transitions in order to ensure seamless transitions among segments. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. The display can hover and then disappear when the decision period ends or when an option has been selected. Further, a timer, countdown or other visual, aural, or other sensory indicator can be presented during playback of content segment to inform the user of the point by which he should (or in some cases must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

The segment that is played after a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video can continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

The techniques described herein can be implemented in any appropriate hardware or software. If implemented as software, the processes can execute on a system capable of running one or more commercial operating systems such as the Microsoft Windows● operating systems, the Apple OS X● operating systems, the Apple iOS● platform, the Google Android platform, the Linux● operating system and other variants of UNIX● operating systems, and the like. The software can be implemented on a general purpose computing device in the form of a computer including a processing unit, a system memory, and a system bus that couples various system components including the system memory to the processing unit.

Figure 1:
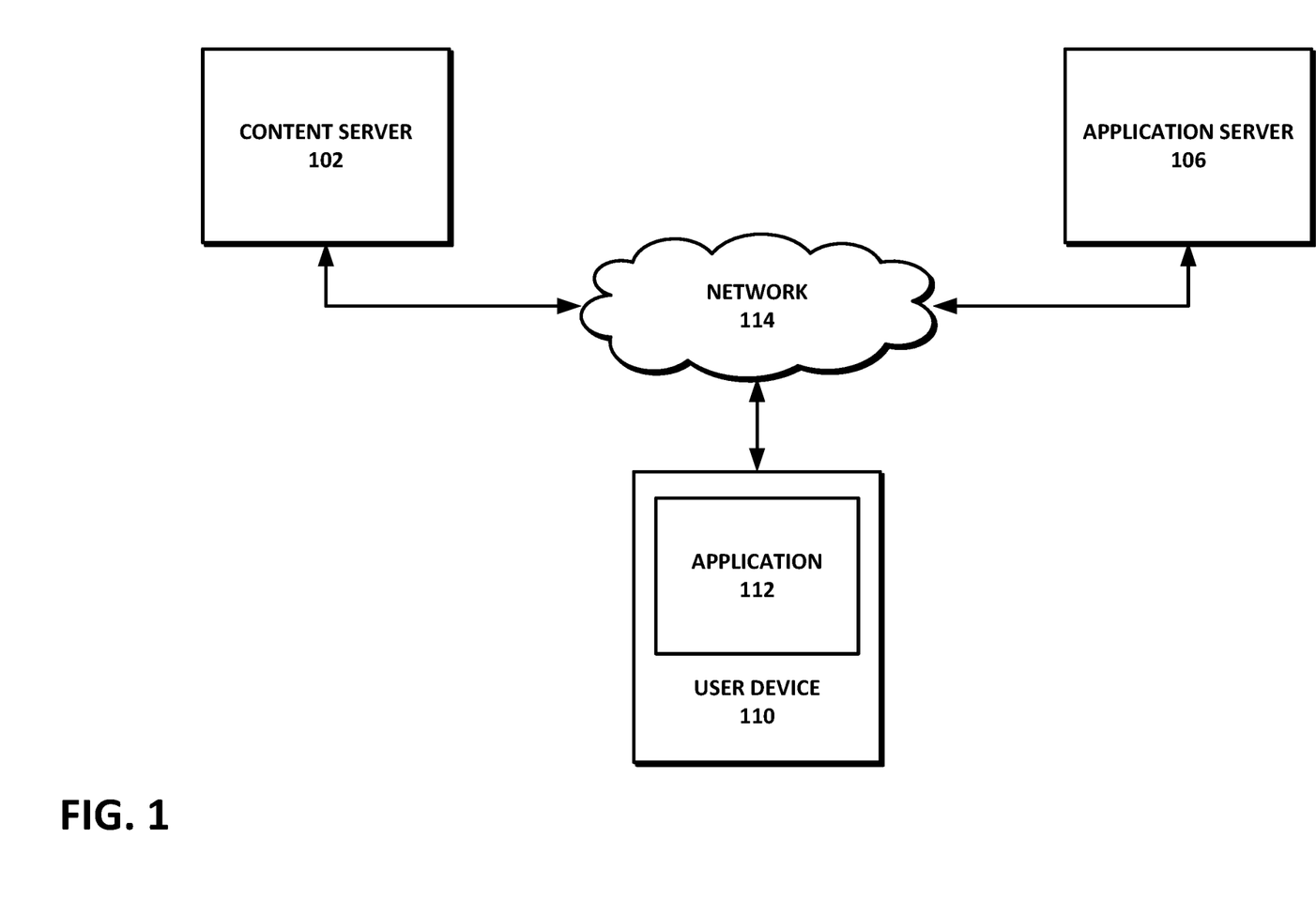
FIG. 1 is a system architecture diagram according to an implementation.

Referring to FIG. 1, the multimedia content described herein can be presented to a user on a user device 110 having an application 112 capable of playing and/or editing the content. The user device 110 can be, for example, a smartphone, tablet, laptop, palmtop, wireless telephone, television, gaming device, music player, mobile telephone, information appliance, workstation, a smart or dumb terminal, network computer, personal digital assistant, wireless device, minicomputer, mainframe computer, or other computing device, that is operated as a general purpose computer or a special purpose hardware device that can execute the functionality described herein.

The described systems can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

The application 112 can be a video player and/or editor that is implemented as a native application, web application, or other form of software. In some implementations, the application 112 is in the form of a web page, widget, and/or Java, JavaScript, .Net, Silverlight, Flash, and/or other applet or plug-in that is downloaded to the device and runs in conjunction with a web browser. The application 112 and the web browser can be part of a single client-server interface; for example, the application 112 can be implemented as a plugin to the web browser or to another framework or operating system. Any other suitable client software architecture, including but not limited to widget frameworks and applet technology can also be employed.

Multimedia content can be provided to the user device 110 by content server 102, which can be a web server, media server, a node in a content delivery network, or other content source. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Figure 2A:
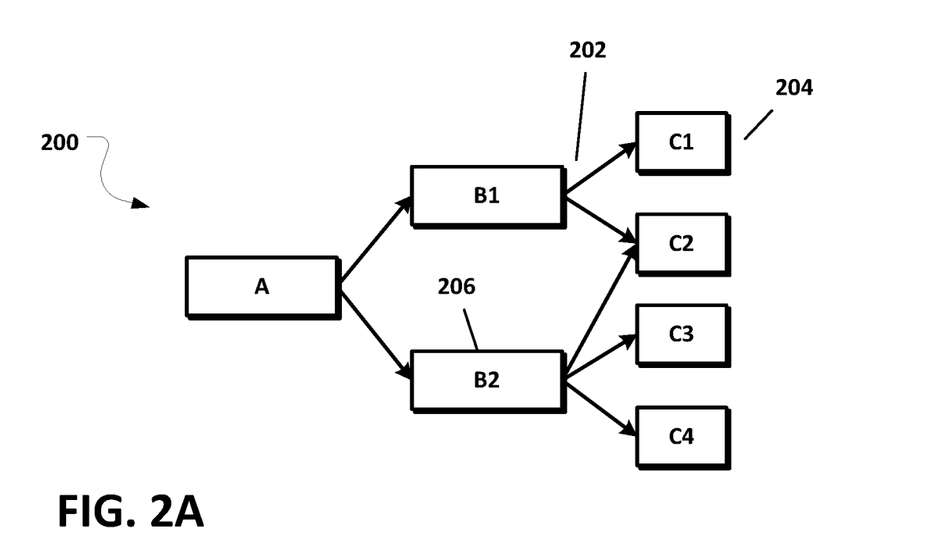
FIGS. 2A and 2B depict an example video tree with a point book mark and path bookmark, respectively.

In one implementation, bookmarks can be automatically or manually added to branching multimedia content. As referred to herein, a "bookmark" refers to a designated location in a branching video or other multimedia presentation. A bookmark can be a "point bookmark," which specifies a location in the video to which the application 112 can seek. A point bookmark can include a timestamp or a positive or negative offset specifying a location in the video with respect to the beginning of the video presentation, the beginning of a particular segment of the video presentation, a decision point or other point in the video presentation. For example, referring to FIG. 2A, a point bookmark can refer to a decision point (point 202, a branching point to segments C1 and C2) in a video tree 200, the end of a segment (point 204, the end of segment C1), or a point within a segment (point 206, within segment B2). A point bookmark can also include a video segment path or name that indicates the location of the bookmark in the video. For example, a bookmark specifying "Segment G" will, when selected, start playback at the beginning of that named segment. A time offset can also be included in the bookmark to start playback at a later point in the named segment. Point bookmarks can be automatically created by the application 112 or automatically created by a user, and can represent events, choices, and other points of interest in a branched video.

Figure 2B:
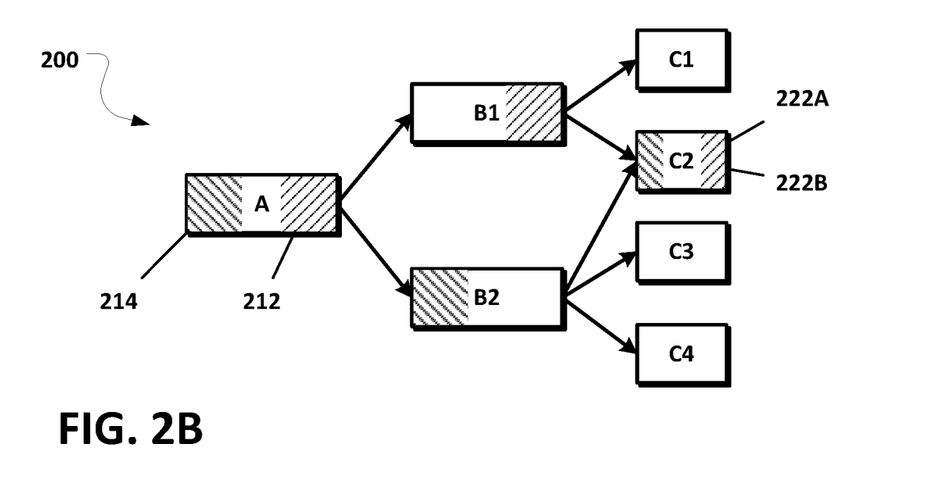

A bookmark can also be a "path bookmark," which represents a path of video segments taken or decisions made over a multimedia presentation based on a tree or other structure. For example, as shown in FIG. 2B, a first path (represented by shading 212) can be segment A→segment B1→segment C2, and a second path (represented by shading 214) can be segment A→segment B2→segment C2 in video tree 200. In this example, there are two path bookmarks 222A and 222B, each specifying segment C2 as the location where playback of the video presentation should commence. However, bookmark 222A represents the first path (A→B1→C2) and bookmark 222B represents the second path (A→B2→C2) and, thus, upon invocation of either bookmark 222A or 222B, although playback will start at segment C2, the associated path and choices made to reach the particular point 222A or 222B will be restored as well. Path bookmarks can include additional information such as the name of a choice made (e.g., male or female singer, left path or right path, etc.), the time a change or decision was made (e.g., 32.5 seconds from the beginning of segment B1, at the decision point in segment A, etc.), and/or the result of a decision (e.g., jump to the beginning of segment C3, restart the video presentation, etc.). As with point bookmarks, a path bookmark can also include a time offset to specify a playback starting point in a particular segment.

A bookmark can be stored in any suitable form. For example, a bookmark can be stored as or connected with a URL, bar code, Quick Response Code, electronic file, and the like. In some implementations, bookmarks can be shared with other users via email, file sharing, or social media (e.g., Facebook, LinkedIn, Twitter).

Figure 3:
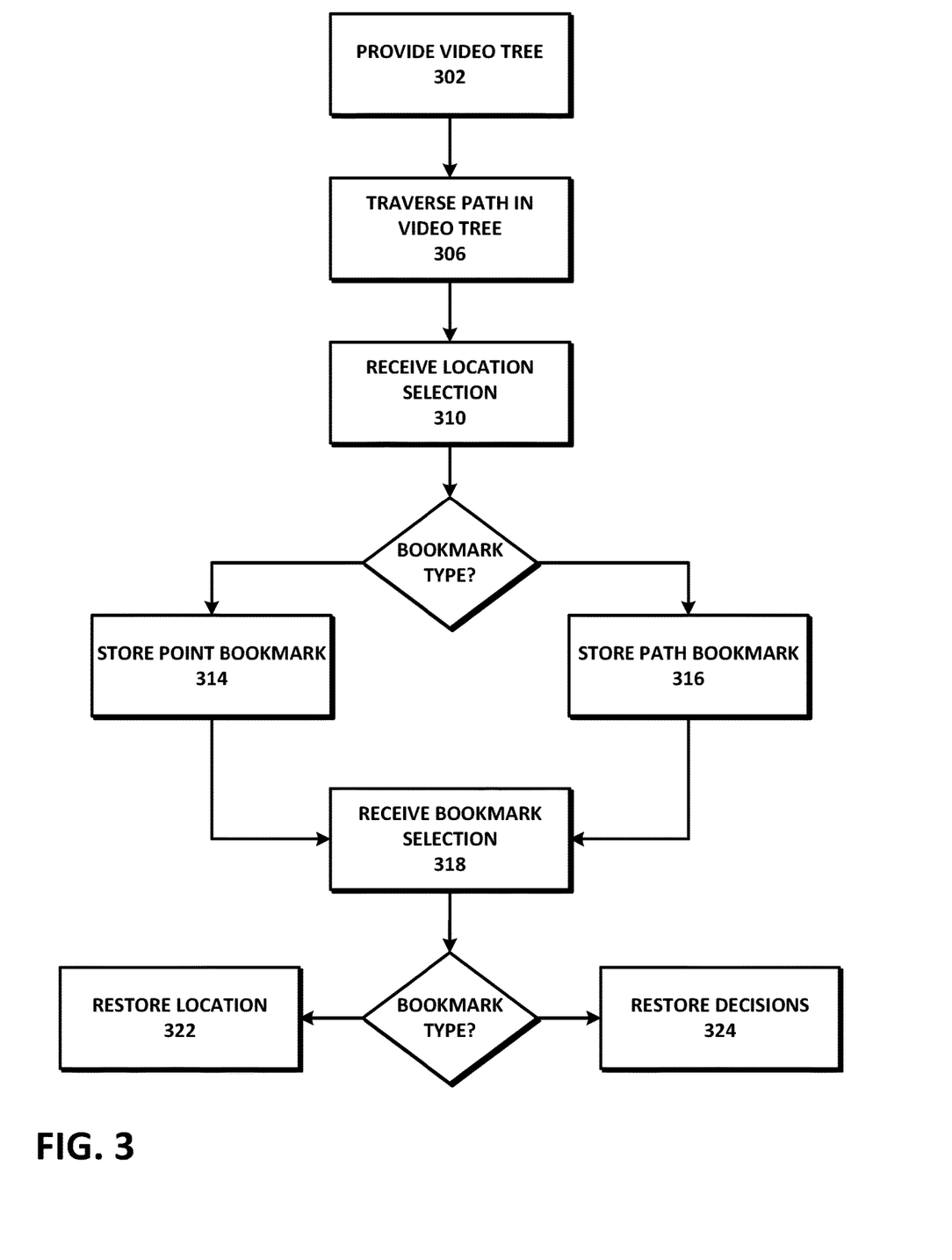
FIG. 3 is a method for bookmarking in branched multimedia content according to an implementation.

FIG. 2 depicts one example of a method for providing bookmarking functionality in a video tree. In STEP 302, a video tree is provided (e.g., via application 112 using content received from content server 102), which includes video segments that are each a predefined portion of one or more paths in the video tree. Each path can be associated with a different video presentation; that is, a different video presentation can be created for each path (sequence of video segments) followed by a user. Based on the decisions of the user made during decision periods and/or at decision points in various video segments, one of the paths in the video tree is traversed by the application 112 (STEP 306).

Figure 4:
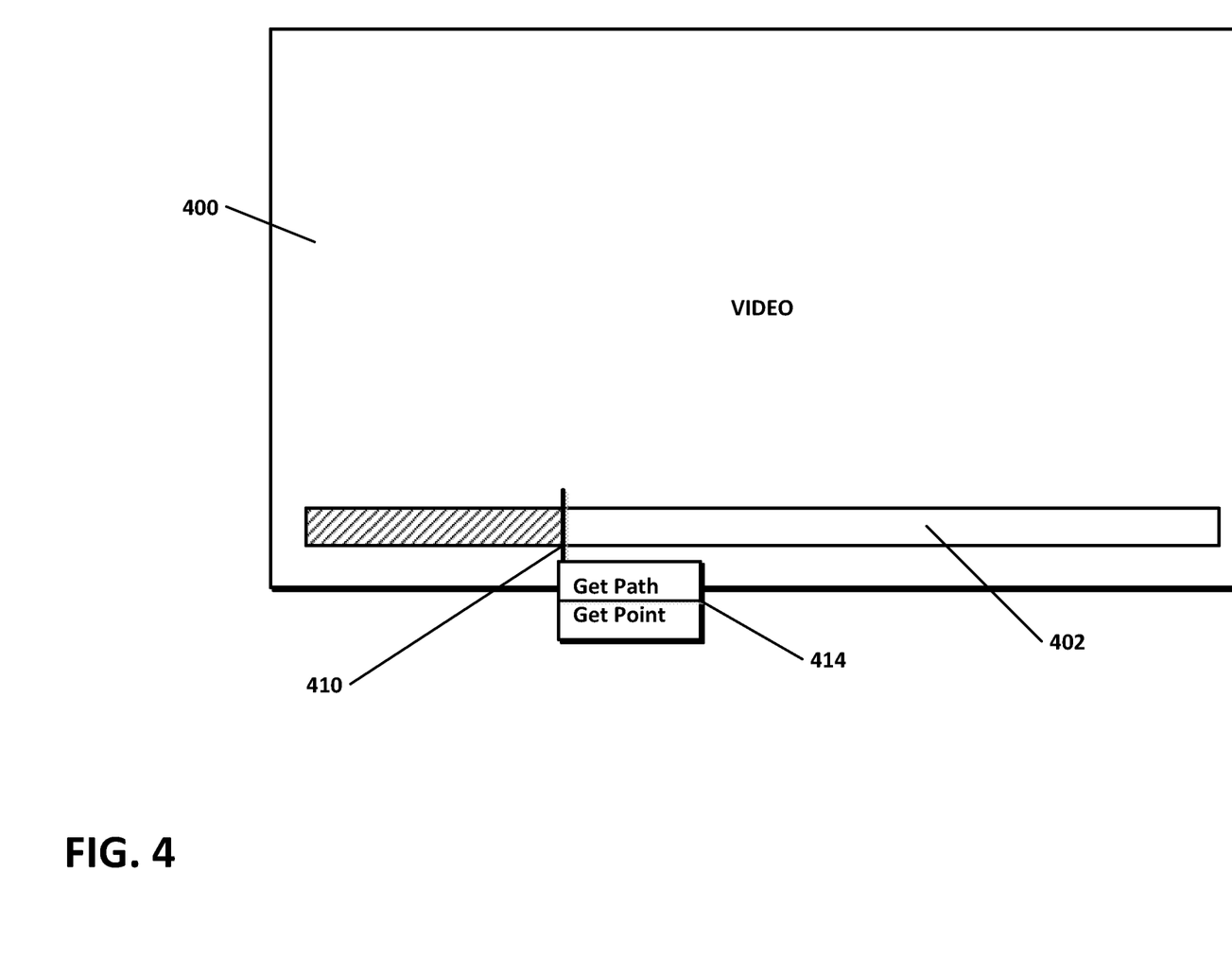
FIG. 4 is a diagram of an example user interface for setting a bookmark.

In STEP 310, the application 112 receives a selection of a location in one of the video segments in the traversed path. The selection can be made automatically (e.g., by the application 112) or by the user viewing or editing the video presentation. For example, as shown in FIG. 4, the user can select a location 410 on a progress bar 402 representing a timeline of the video presentation 400. In one implementation, a user interface element, such as dropdown box 414, can be provided to the user by the application 112 so that the user can selected whether to create a path or point bookmark at the selected location 410.

In some implementations, bookmarks can be associated with a video presentation during its editing and/or creation. For example, the application 112 can automatically create a list of bookmarks representing points of interest in the video tree, such as particular segments, decision points, decision periods, locations of interactive multimedia (e.g., buttons or other interface elements appearing on the video). In one instance, the application 112 automatically creates a table of contents for the video. In other implementations, one or more video segments in the video tree can be analyzed by other software programs to automatically suggest other points of interest. For example, image analysis can be performed to locate all instances in which an advertised product occurs in a video, audio recognition can be used to create bookmarks when particular songs are playing, and so on.

In another implementation, the application 112 considers one or more video parameters, statistics, and/or other attributes in automatically creating a list of bookmarks. This can include, for example, data associated with the user, such as demographics, geography, and social media information (e.g., accounts, connections, likes, tweets, etc.); historical data, such as decisions or selections made in previous plays of a video presentation by the user, the user's friends, the user's social networking connections, and/or other users; content information, such as video length, segment length, path length, and content subject matter, and so on. For example, a bookmark can be created for an video segment option based on how popular that option is and/or how many times the option was chosen or not chosen by the user or by other users.

It is to be appreciated that a vast number of possibilities exists for the automatic creation of point and path bookmarks based on the video tree structure, segment content, and other parameters and statistics. Examples of automatically created bookmarks include, but are not limited to, the shortest path to reach a segment, the most popular segment among the user's friends from a selection of segment options, the most commonly reached final segment in a video tree in the user's country, the most popular first segment option selected by other users who expressed an interest in a particular product in a different video, the least popular path followed among all users, and so on.

In one implementation, a dynamic bookmark can be created by a user or automatically created by the application 112. A "dynamic bookmark" can refer to a bookmark that includes a reference to a tracked statistic. The statistic can be updated in real-time or periodically based on the particular activity or activities that the statistic tracks. The application 112 can track activities and statistics locally and/or can communicate with a remote server, such as applications server 106, for tracking statistics over a number of separate users. Statistics can be those as described above, such as the popularity of a selection made during a video presentation.

In one example, the tracked statistic represents the most popular choice among all users of three drinks that a particular user can select from at a decision point in the video tree. The dynamic bookmark can be tied to the tracked statistic such that, when the dynamic bookmark is selected, the current state of the statistic determines where the bookmark will map to in the video tree. Referring to the drinks example, at time 1, soda may be the most popular drink according to the statistic and, when the dynamic bookmark is selected at time 1, the application 112 seeks to the segment in the video tree corresponding to the soda choice. Then, popular opinion changes over time and, at time 2, beer is now the most popular drink. Accordingly, when the dynamic bookmark is selected at time 2, the application 112 seeks to the segment in the video tree corresponding to the beer choice. The statistic associated with a dynamic bookmark can be referred to every time the bookmark is selected or, alternatively, the statistic when updated or otherwise on a periodic basis can be pushed to the dynamic bookmark to avoid the need for looking up the statistic in each instance.

Still referring to FIG. 3, the selected location in the video tree is stored for subsequent retrieval as a bookmark, for example, locally on the user device 110 and/or on a remote server such content server 102 or application server 106. The bookmark can be stored in the form of a point bookmark (STEP 314) and/or a path bookmark (STEP 316), such as those described herein. For example, a path bookmark can include information identifying a sequence of video segments in the video tree that were traversed to reach the location.

After creation of the bookmark, it can be retrieved by the same user or a different user (e.g., if the bookmark is made available on a publicly accessible server or otherwise shared). The bookmark can be made accessible and/or displayed to one or more users in a menu, library, list, or other format, and can be visually represented as text and/or images (e.g., a thumbnail of the video frame at the bookmarked location). In one implementation, a visual indicator of a bookmark is displayed on a timeline or progress bar at a location representing the point in time in the video presentation or a particular segment corresponding to the bookmark.

In STEP 318, a selection of the bookmark is received and, based on the selection, the application 112 restores the bookmark in accordance with its form. The bookmark can be selected by the user, by another user, or automatically by the application 112. If the stored bookmark is a point bookmark, the application 112 can seek to the bookmarked location in the associated video segment (STEP 322). The application 112 can begin playing the video from this location or can stop or pause playback of the video after seeking. If, on the other hand, the stored bookmark is a path bookmark, the application 112 can seek to the bookmarked location as well as restore the path traversed and/or decisions made to reach the bookmarked location (STEP 324).

In some implementations, the application 112 automatically selects the bookmark. For example, the application 112 can send the user to a particular bookmark at the start of or during playback of a video presentation. For example, if in traversing a different video presentation the user selects a segment option indicating his gender, the application 112 can cause playback of the first video presentation to jump to a bookmark associated with the user's gender. In other implementations, when seeking forward or backward along a video, the application 112 can "snap" to a particular bookmarked location.

In one implementation, when a path bookmark is restored, a visual representation of the path traversed and/or decisions made to reach the bookmarked location is provided to the application user. The visual representation of the path and/or decisions can be provided, for example, in a tree format such as that shown in FIGS. 2A and 2B, with visual indicators designating the sequence of segments traversed. The visual representation of the path and/or decisions can also be represented on a dynamic progress bar and/or dynamic timeline that support branched video, such as those described in U.S. patent application Ser. No. 13/622,795, filed Sep. 19, 2012, and entitled "Progress Bar for Branched Videos," and U.S. patent application Ser. No. 14/249,665, filed Apr. 10, 2014, and entitled, "Dynamic Timeline for Branched Video," the entireties of which are incorporated by reference herein.

Upon restoration of a bookmark, decisions that were made by the user along the path (e.g., decisions made at decision points or during decision periods) to reach the bookmarked location can also be visually represented as, for example, text and/or images associated with the decisions made. For example, if at a decision point in the video presentation, and prior to creating the bookmark, the user had selected a female character instead of a male character to continue the presentation with, that decision can be represented as a thumbnail image of the girl shown on the visual representation of the path provided on restoration of the bookmark.

In some implementations, a user is able to interact with the visual representation of the path/decisions (e.g., if the representation is provided on a progress bar or timeline) that is provided when a bookmark is restored. For example, the user can select a point in time on the path of segments leading up to the bookmarked location in order to seek to that point. However, if video segments in the path prior to the bookmarked location are not buffered or otherwise locally cached, they may need to be retrieved by the application 112 from the content server 102 prior to commencing playback of video at the point in time selected by the user.

Figure 5A:
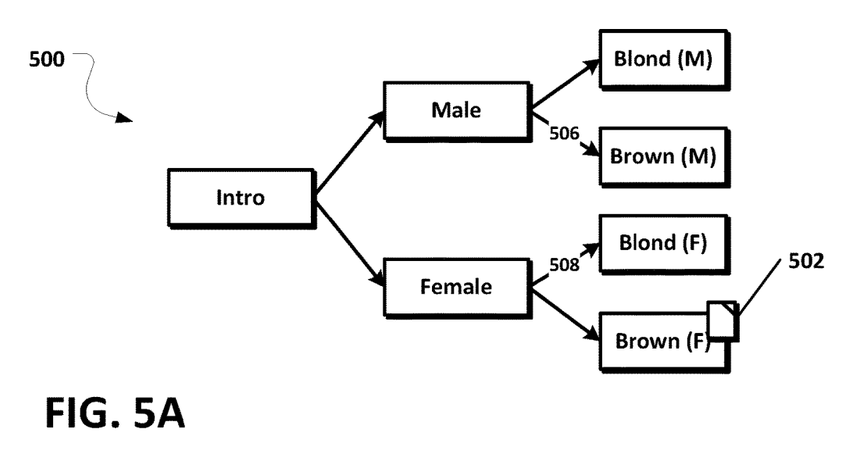
FIG. 5A depicts an example video tree with a bookmarked segment.

In one implementation, path and/or point bookmarks are automatically updated upon a change in content or structure of the underlying media presentation, such as a change in segment length, alteration of the tree structure (e.g., addition or removal of a segment, addition or removal of a connection between segments, etc.), modification of the video, audio, or interface, and so on. For example, FIG. 5A depicts a video tree 500 used in an interactive advertisement for shampoo. During the first segment ("Intro"), the user can select a gender option ("Male" or "Female") and, during playback of the selected gender segment, the user can select a hair color ("Blond" or "Brown"). The hair color segment includes a video describing the best shampoo for the user. In this case, a bookmark 502 exists at the video segment associated with brown hair for a female. If represented as a point bookmark, the bookmark 502 can refer to "Brown (F)," whereas if the bookmark 520 is represented as a path bookmark, it can refer to "Intro→Female→Brown (F)."

Figure 5B:
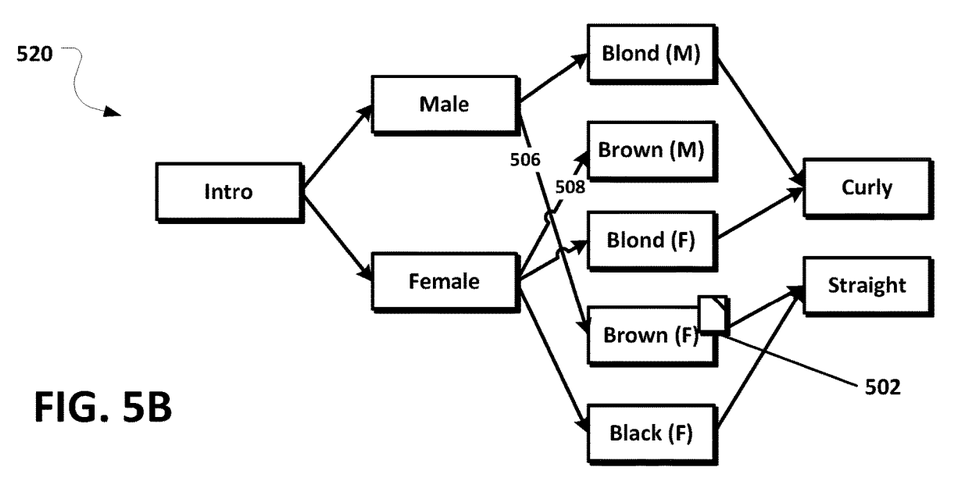
FIG. 5B depicts a modified version of the video tree of FIG. 5A.

FIG. 5B depicts a video tree 520 that is a modified version of the video tree 500 in FIG. 5A. In this instance, the video tree 520 has been edited so that connections 506 and 508 are exchanged (i.e., "Male→Brown (M)" is now "Male→Brown(F)," and "Female→Brown(F)" is now "Female→Brown(M)"). Further, a new segment option for black hair color has been added to the female branch ("Black (F)"), and new final video segment options for "Curly" and "Straight" hair now branch from several hair color segments, including bookmarked segment 502 ("Brown (F)"). In addition, the video content for the "Brown (F)" segment has been updated to use a different female model (not shown). Despite these changes, bookmark 502 continues to point to the "Brown (F)" segment, and a user selecting the bookmark 502 will be guided to the same location in the video presentation whether traversing video tree 500 or video tree 520. If the bookmark 502 is a path bookmark, the bookmark 502 can be updated to reflect the new path to the bookmarked segment (from "Intro→Female→Brown (F)" to "Intro→Male→Brown (F)").

Updates to a bookmark can be automatically performed by the application 112 (e.g., a video editor, player or content authoring tool). In some instances, content segments are stored in a file and directory structure and, upon a change to the video tree and associated directory structure, the bookmark is updated, if necessary, to point to the new location of the segment. If the filename of the bookmarked segment is modified, the old name can be linked to the new name to allow the bookmark to correctly persist. In the case where a segment in the path of segments to the bookmarked location is added or removed (e.g., if the "Male" and "Female" options from FIG. 5A are removed, and the hair color options are changed to branch from the "Intro" segment), the bookmark can be updated to account for the change in path (e.g., from "Intro→Female→Brown (F)" to "Intro→Brown (F)"). Likewise, if using a directory structure, if the hierarchy of folders is changed to add or remove an intermediate subfolder, the segment path associated with the bookmark can be changed accordingly.

Prior to publishing a video presentation, the application 112 can verify that all bookmarks associated with the video presentation are valid, and update any bookmarks that need to be mapped to new locations based on changes to the video structure. If the application 112 encounters a bookmark that cannot be updated (e.g., if the bookmarked location has been deleted), the application 112 can notify the video editor and allow him to manually update the bookmark. In some implementations, bookmarks that are invalid or cannot be updated can point to a default location, such as the beginning of the first segment in the video structure.

One will appreciate the various uses of the techniques described herein. For example, an advertisement for shampoo can include various bookmarked locations, and a user can be provided to a link to an appropriate location in the advertisement (e.g., a video segment relating to a shampoo product for blondes) based on information known about or gathered from the user. In another example, a user can interact with a video presentation to select a desired product, and the user is redirected to a website where the user can buy the product. At the website, the user can view the product and other products, and can be provided with bookmarks to locations in the video where those products appear.

In a further example, a user watching an interactive educational video can dive into various topics and create one or more bookmarks saving the locations he visited in the video. At a later time, the user can return to the video and select the bookmarks to recreate the paths he took to reach each topic. Similarly, a news video can have a number of associated bookmarks that each point to a specific section of the news (e.g., weather, sports, etc.). Even if new content segments are added or the particular content the bookmark points to is changed (e.g., news content segments are updated each day), the bookmark can be configured to always direct the user to the same place in the corresponding video tree. In yet another example, an interactive video game is provided using a video tree such as those described herein. The user can create a bookmark to save his progress and, using the bookmark at a later time, restore the sequence of events and decisions he made in playing the game up to the bookmarked point. As another example, a bookmark can be created for a most-traversed path of songs or music videos in an interactive media presentation, and a user can select the bookmark to play the path on a television or radio. The bookmark can also be dynamically updated as the most-viewed path changes from time to time.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A method comprising:
   providing a branching video presentation comprising a plurality of video segments, each video segment comprising a predefined portion of one or more paths in the branching video presentation, the one or more paths being associated with one or more products;
   storing a plurality of bookmarks at different locations in the branching video presentation for subsequent retrieval, wherein each bookmark represents at least one product characteristic associated with a path portion traversed to reach the location in the branching video presentation corresponding to the bookmark;
   receiving at least one user characteristic associated with a user;
   identifying a bookmark from the plurality of bookmarks that represents at least one product characteristic associated with the at least one user characteristic; and commencing playback of the branching video presentation from the location of the identified bookmark.

2. The method of claim 1, wherein the branching video presentation corresponds to a video presentation displayed on a website and the one or more products correspond to content included on the website.

3. The method of claim 2, wherein receiving the at least one user characteristic includes receiving the at least one user characteristic from the website or at least one server associated with the website.

4. The method of claim 1, wherein the location of the identified bookmark corresponds to a node in the branching video presentation, the node being linked to a first path of the one or more paths in the branching video.

5. The method of claim 4, wherein the node corresponds to a first video segment in the first path.

6. The method of claim 5, wherein the identified bookmark is located at the beginning of the first video segment.

7. The method of claim 5, wherein the identified bookmark includes an offset from the beginning of the first video segment.

8. The method of claim 5, wherein the first video segment includes a decision period during which the user can choose from a plurality of options during playback of the first video segment, and wherein a second video segment to be played after the first video segment is determined based on a selection made by the user during the decision period.

9. The method of claim 1, further comprising:
receiving at least one video interaction from the user during playback of the branching video presentation from the location of the identified bookmark; and
redirecting the user to a website based on the identified bookmark and the at least one video interaction.

10. The method of claim 9, further comprising:
receiving at least one website interaction from the user;
identifying a second bookmark from the plurality of bookmarks that represents at least one product characteristic associated with the at least one website interaction; and
commencing playback of the branching video presentation from the location of the identified second bookmark.

11. A system comprising:
one or more computers programmed to perform operations comprising:
providing a branching video presentation comprising a plurality of video segments, each video segment comprising a predefined portion of one or more paths in the branching video presentation, the one or more paths being associated with one or more products;
storing a plurality of bookmarks at different locations in the branching video presentation for subsequent retrieval, wherein each bookmark represents at least one product characteristic associated with a path portion traversed to reach the location in the branching video presentation corresponding to the bookmark;
receiving at least one user characteristic associated with a user;
identifying a bookmark from the plurality of bookmarks that represents at least one product characteristic associated with the at least one user characteristic; and
commencing playback of the branching video presentation from the location of the identified bookmark.

12. The system of claim 11, wherein the branching video presentation corresponds to a video presentation displayed on a website and the one or more products correspond to content included on the website.

13. The system of claim 12, wherein receiving the at least one user characteristic includes receiving the at least one user characteristic from the website or at least one server associated with the website.

14. The system of claim 11, wherein the location of the identified bookmark corresponds to a node in the branching video presentation, the node being linked to a first path of the one or more paths in the branching video.

15. The system of claim 14, wherein the node corresponds to a first video segment in the first path.

16. The system of claim 15, wherein the identified bookmark is located at the beginning of the first video segment.

17. The system of claim 15, wherein the identified bookmark includes an offset from the beginning of the first video segment.

18. The system of claim 15, wherein the first video segment includes a decision period during which the user can choose from a plurality of options during playback of the first video segment, and wherein a second video segment to be played after the first video segment is determined based on a selection made by the user during the decision period.

19. The system of claim 11, wherein the one or more computers are further programmed to perform operations comprising:
receiving at least one user interaction during playback of the branching video presentation from the location of the identified bookmark; and
redirecting the user to a website based on the identified bookmark and the at least one user interaction.

20. The system of claim 19, wherein the one or more computers are further programmed to perform operations comprising:
receiving at least one website interaction from the user;
identifying a second bookmark from the plurality of bookmarks that represents at least one product characteristic associated with the at least one website interaction; and
commencing playback of the branching video presentation from the location of the identified second bookmark.

* * * * *